United States Patent
Zhao et al.

(10) Patent No.: US 8,064,697 B2
(45) Date of Patent: Nov. 22, 2011

(54) LAPLACIAN PRINCIPAL COMPONENTS ANALYSIS (LPCA)

(75) Inventors: Deli Zhao, Beijing (CN); Zhouchen Lin, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/871,764

(22) Filed: Oct. 12, 2007

(65) Prior Publication Data

US 2009/0097772 A1     Apr. 16, 2009

(51) Int. Cl.
*G06K 9/00* (2006.01)
*G06T 7/00* (2006.01)

(52) U.S. Cl. .................... 382/181; 382/276; 382/118

(58) Field of Classification Search .................. 382/181, 382/276, 277, 118
See application file for complete search history.

(56) References Cited

U.S. PATENT DOCUMENTS

| | | | |
|---|---|---|---|
| 5,164,992 A * | 11/1992 | Turk et al. ..................... | 382/118 |
| 6,826,300 B2 | 11/2004 | Liu et al. | |
| 6,947,042 B2 | 9/2005 | Brand | |
| 7,123,783 B2 | 10/2006 | Gargesha et al. | |
| 7,242,810 B2 | 7/2007 | Chang | |
| 7,254,257 B2 | 8/2007 | Kim et al. | |
| 2005/0094849 A1 | 5/2005 | Sung et al. | |
| 2006/0045353 A1 | 3/2006 | Brand | |
| 2006/0235812 A1 | 10/2006 | Rifkin et al. | |
| 2006/0251324 A1 | 11/2006 | Bachmann et al. | |
| 2007/0104351 A1 | 5/2007 | Yang et al. | |

OTHER PUBLICATIONS

Belkin et al. "Laplacian Eigenmaps and Spectral Techniques for Embedding and Clustering", Advances in Neural Information Processing Systems 14, vol. 14, 2002. pp. 585-591.*
Chen et al. "Face Recognition Based on Two-Phase 2DLEM." 2006 International Conference on Wireless, Mobile and Multimedia Networks, Nov. 6, 2006, 4 pages.*
He et al. "Face Recognition Using Laplacianfaces." IEEE Transactions on Pattern Analysis and Machine Intelligence, vol. 27, No. 3, Mar. 2005, pp. 328-340.*
Cai, et al., "Learning a Spatially Smooth Subspace for Face Recognition", available at least as early as Sep. 17, 2007, at <<http://www-faculty.cs.uiuc.edu/~hanj/pdf/cvpr07_dengcai.pdf>>, pp. 7.
Zhang, et al., "Nearest Manifold Approach for Face Recognition", available at least as early as Sep. 17, 2007, at <<http://www.cbsr.ia.ac.cn/users/szii/papers/ZJP-FG2004.pdf>>, pp. 6.
Zhang, et al., "Optimal Dimensionality of Metric Space for Classification", at <<http://www.machinelearning.org/proceedings/icml2007/papers/35.pdf>>, Proceedings of the 24th International Conference on Machine Learning, 2007, pp. 8.
Zhao, "Tangential Eigenmaps: A Unifying Geometric Framework for Manifold Learning", available at least as early as Sep. 17, 2007, at <<http://zhaodeli.googlepages.com/Tangential_Eigenmaps.pdf>>, pp. 11.

* cited by examiner

*Primary Examiner* — Jon Chang
(74) *Attorney, Agent, or Firm* — Lee & Hayes, PLLC

(57) ABSTRACT

Systems and methods perform Laplacian Principal Components Analysis (LPCA). In one implementation, an exemplary system receives multidimensional data and reduces dimensionality of the data by locally optimizing a scatter of each local sample of the data. The optimization includes summing weighted distances between low dimensional representations of the data and a mean. The weights of the distances can be determined by a coding length of each local data sample. The system can globally align the locally optimized weighted scatters of the local samples and provide a global projection matrix. The LPCA improves performance of such applications as face recognition and manifold learning.

20 Claims, 6 Drawing Sheets

LAPLACIAN PRINCIPAL COMPONENTS ANALYSIS (LPCA)

BACKGROUND

Principal Components Analysis (PCA) is widely used in computer vision, pattern recognition, and signal processing. PCA enables analysis by reducing multidimensional data sets to a lower number of dimensions. PCA can be considered an orthogonal linear transformation that maps data to new coordinate systems, with the greatest variance by any projection of the data lying on the first coordinate (called the first principal component or principal subspace), the second greatest variance on the second coordinate, etc. Thus, PCA is conventionally used for dimensionality reduction in data sets by retaining those attributes of the data set that contribute most to its variance in lower-order principal components and discarding higher-order principal components. The low-order components usually contain the "most important" attributes of the data.

In face recognition, for example, PCA is performed to map samples into a low-dimensional feature space where the new representations are viewed as expressive features. In a feature space, each sample is typically represented as a point in n-dimensional space that has a dimensionality determined by the number of features used to describe the sample. Discriminators like Linear Discriminant Analysis (LDA), Locality Preserving Projection (LPP), and Marginal Fisher Analysis (MFA) are performed in the PCA-transformed spaces. In active appearance models (AAM) and 3-dimensional (3D) morphable models, textures and shapes of faces are compressed in PCA-learned texture and shape subspaces. These texture and shape features enable deformation and matching between faces.

In manifold learning, tangent spaces of a manifold are presented by the PCA subspaces and tangent coordinates are the PCA features. Representative algorithms in manifold learning, such as Hessian Eigenmaps, local tangent space alignment (LTSA), S-Logmaps, and Riemannian normal coordinates (RNC) are all based on tangent coordinates. In addition, K-Means, the classical algorithm for clustering, was proven equivalent to PCA in a relaxed condition. Thus, PCA features can be naturally adopted for clustering. The performance of the algorithms mentioned above is determined by the subspaces and the features yielded by PCA. There are also variants of PCA, such as probabilistic PCA, kernel PCA (KPCA), robust PCA, non-negative PCA, weighted PCA, generalized PCA, and sparse PCA.

However, PCA has some limitations. First, PCA is sensitive to noise. Noise samples may cause significant change of the principal subspaces. PCA becomes unstable with perturbed sample points. To address this issue, robust PCA algorithms have been proposed, but these sacrifice the simplicity of PCA.

Weighted PCA was developed to perform smoothing on local patches of data in manifold learning. An iterative approach was used to compute weights that have convergences that cannot be guaranteed. Weighted PCA is performed only on local patches of data with no insight into how to derive a global projection matrix from locally weighted scatters.

In principle, PCA is only reasonable for samples in Euclidean spaces where distances between samples are measured by L2 norms. For non-Euclidean sample spaces, the scatter of samples cannot be represented by the summation of Euclidean distances. For instance, histogram features are non-Euclidean. Their distances are better measured by Chi square techniques. Therefore, the principal subspaces of such samples cannot be optimally obtained by conventional PCA. The KPCA algorithm was designed for extracting principal components of samples whose underlying spaces are non-Euclidean. However, KPCA cannot explicitly produce principal subspaces of samples, which are required in many applications. Besides, KPCA is also sensitive to noise data because its criterion for optimization is intrinsically equivalent to PCA.

SUMMARY

Systems and methods perform Laplacian Principal Components Analysis (LPCA). In one implementation, an exemplary system receives multidimensional data and reduces dimensionality of the data by locally optimizing a scatter of each local sample of the data. The optimization includes summing weighted distances between low dimensional representations of the data and a mean. The weights of the distances can be determined by a coding length of each local data sample. The system can globally align the locally optimized weighted scatters of the local samples and provide a global projection matrix. The LPCA improves performance of such applications as face recognition and manifold learning.

This summary is provided to introduce the subject matter of Laplacian Principal Components Analysis (LPCA), which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for Laplacian Principal Components Analysis (LPCA) and its applications. Exemplary systems and methods offer enhanced robustness over conventional PCA and are free from various limitations of metrics. In contrast to conventional PCA, an exemplary LPCA system first formulates the scatter of samples on local patches of data by weighted summation of distances. This local scatter can be expressed in a compact form similar to the expression of global scatter in conventional PCA. Furthermore, an exemplary general framework aligns local scatters to a global scatter. The alignment framework is further applicable to methods that are based on spectral analysis in manifold learning. In one implementation, an optimal principal subspace can be obtained by solving a straightforward Eigen-decomposition problem. Moreover, the exemplary system provides an efficient approach for computing local LPCA features that are frequently utilized as tangent coordinates in manifold learning.

An application of exemplary LPCA is described in which tangential maps are developed for manifolds based on tangential coordinates approximated by exemplary local LPCA. In particular, one implementation of the exemplary system locally determines weights by analyzing reductive coding length of a local data patch, in which variation of the coding length of a data set is prompted by leaving one point out. This exemplary technique can locally capture the principal structures of the data.

The following symbols and notation listed in Table (1) will be used in the description that follows:

TABLE 1

List of Symbols

| | |
|---|---|
| I | The identity matrix |
| H | $H = I - \frac{1}{n}ee^T$ |
| $x_i$ | The i-th sample in $R^D$ |
| X | $X = [x_1, \ldots, x_n]$ |
| $x_{i_k}$ | The k-th nearest neighbor of $x_i$ |
| $X_i$ | $X_i = [x_{i_0}, x_{i_1}, \ldots, x_{i_K}]$ |
| tr | The trace of a matrix |
| $X^T$ | The transpose of X |
| $H_w$ | $H_w = I - \frac{W_i ee^T}{eW_i e^T}$ |
| e | The all-one column vector |
| $R^D$ | The D-dimensional Euclidean space |
| $S^x$ | $S^x = \{x_1, \ldots, x_n\}$ |
| $\bar{x}$ | $\bar{x} = \frac{1}{n}Xe$ |
| $S_i^x$ | $S_i^x = \{x_{i_0}, x_{i_1}, \ldots, x_{i_K}\}$ |
| $y_i$ | The representation of $x_{i_k}$ in $R^d$ |
| det | The determinant of a matrix |
| $W_i$ | $W_i = \text{diag}(x_{i_0}, x_{i_1}, \ldots, x_{i_K})$ |

Exemplary System

Figure 1:
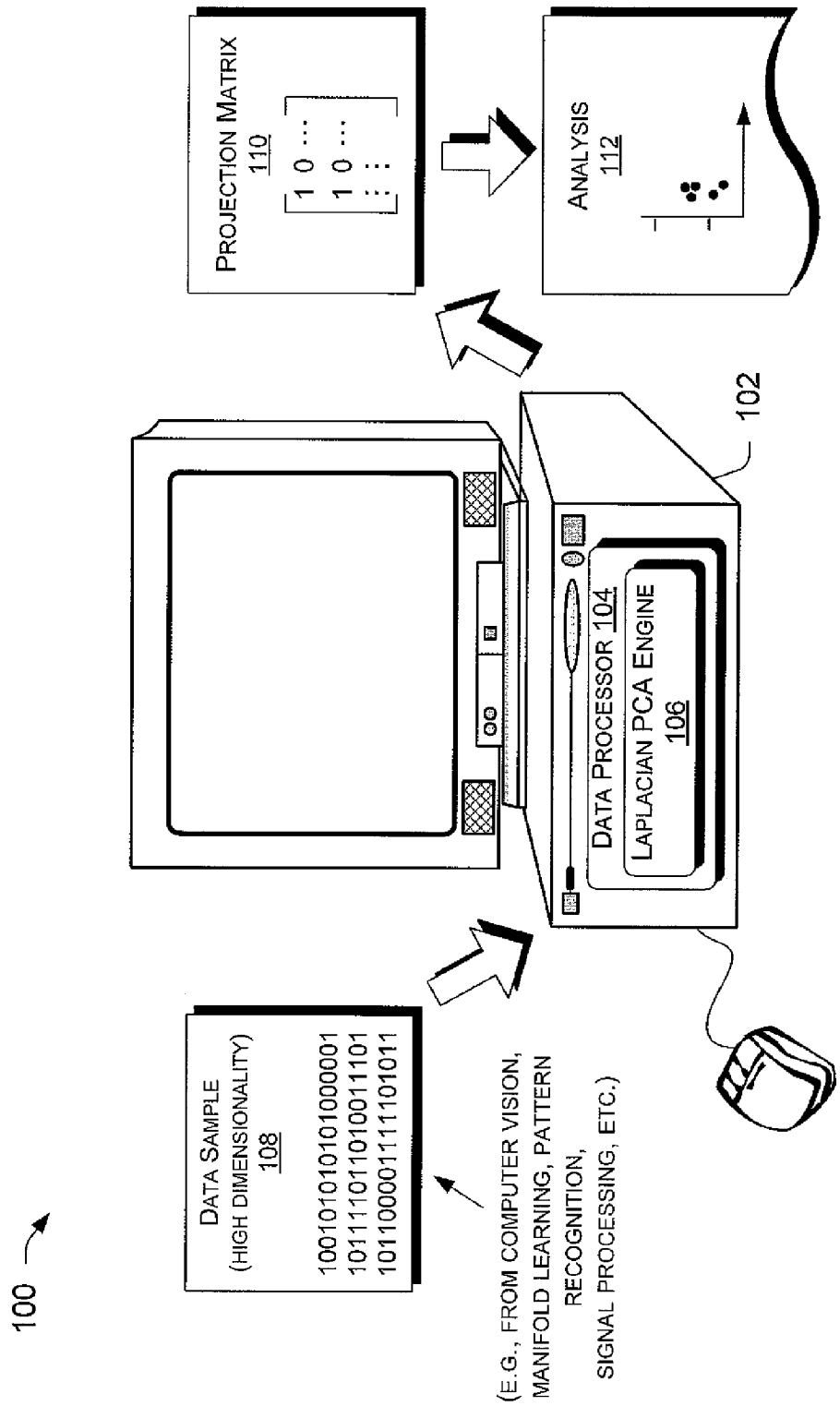
FIG. 1 is a diagram of an exemplary Laplacian Principal Components Analysis (LPCA) system.

FIG. 1 shows an exemplary LPCA system 100, in which a computing device 102 hosts a data processor 104 that includes an exemplary LPCA engine 106. The computing device 102 can be a desktop computer, notebook computer, mobile computing device with processor, memory, data storage, etc. The LPCA engine 106 enables the data processor 104 to operate on data sample 108 (e.g., of high dimensionality), which may be data from a device or application associated with computer vision, manifold learning, face identification, pattern recognition, signal processing, etc. The LPCA engine 106 can produce a projection matrix 110 based on data of lower dimensionality, which the data processor 104 or another entity can use to create a data analysis 112 or a model based on the original data sample 108.

The exemplary LPCA system 100 provides improved results over conventional PCA, for example the LPCA system 100 has reduced sensitivity to noise and is compatible with non-Euclidean samples. Further, the LPCA system: 100 optimizes locally weighted scatters instead of a single global non-weighted scatter used in conventional PCA, can learn principal subspaces by alignment of local optimizations, and uses an exemplary new general alignment technique. The exemplary LPCA system 100 presents a new approach to determining weights, based on the coding length in information theory. In one exemplary application, the LPCA system 100 formulates tangential maps in manifold learning, which can then be exploited for non-linear dimensionality reduction.

Exemplary Engine

Figure 2:
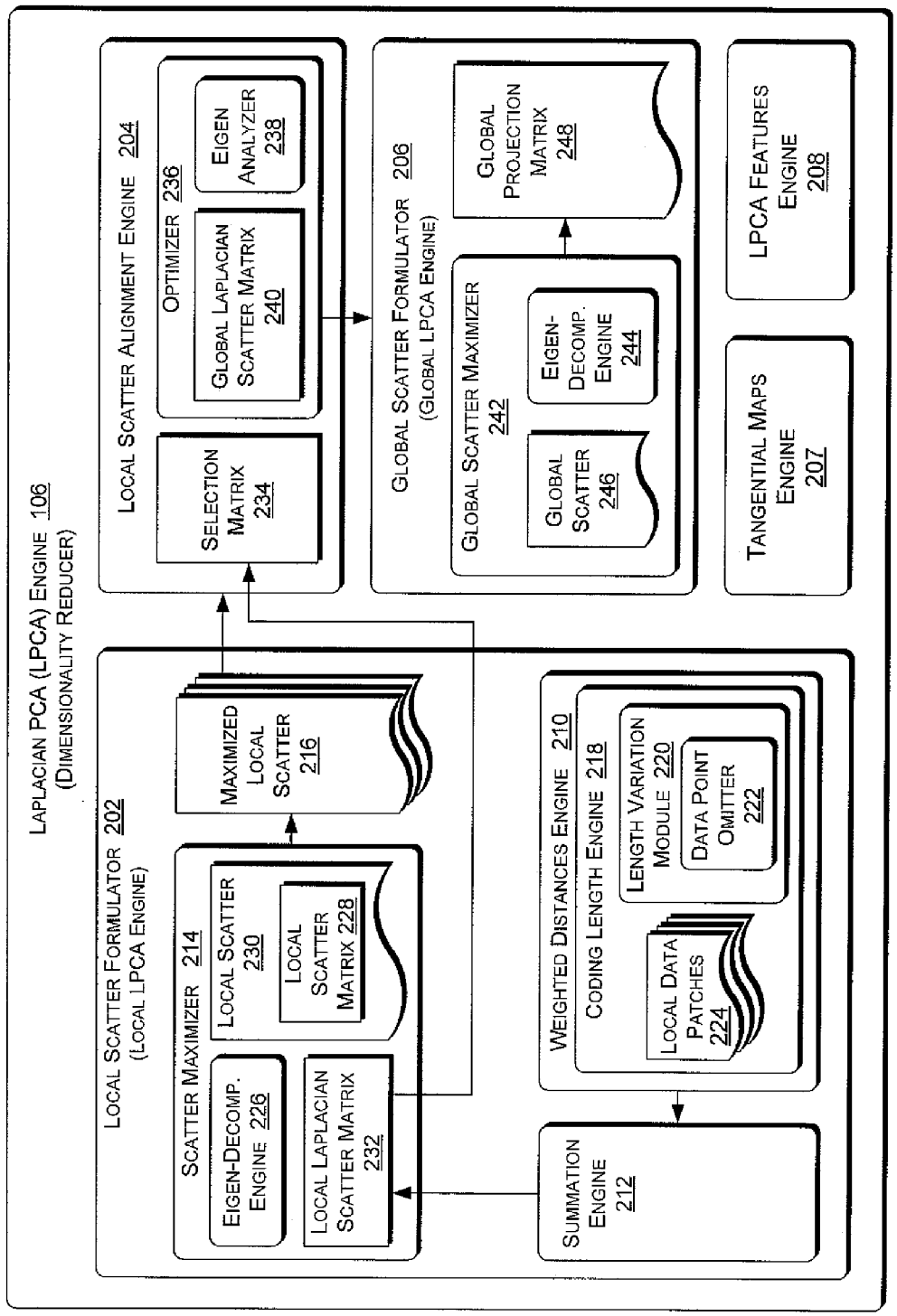
FIG. 2 is a block diagram of an exemplary LPCA engine.

FIG. 2 shows an example version of the LPCA engine 106 of FIG. 1, in greater detail. The illustrated implementation is one example configuration, for descriptive purposes. Many other arrangements of the components of an exemplary LPCA engine 106 are possible within the scope of the subject matter. Such an exemplary LPCA engine 106 can be executed in hardware, software, or combinations of hardware, software, firmware, etc.

In one implementation, the exemplary LPCA engine 106 includes a local scatter formulator 202, a local scatter alignment engine 204, a global scatter formulator 206, an optional tangential maps engine 207 and an optional LPCA features engine 208.

The local scatter formulator 202 may further include a weighted distances engine 210, a summation engine 212, and a scatter maximizer 214 to produce maximized local scatter 216.

The weighted distances engine 210 further includes a coding length engine 218, in which a length variation module 220 that has a data point omitter 222 operates on local data patches 224.

The (local) scatter maximizer 214 includes an Eigen-decomposition engine 226 that operates on a local scatter matrix 228 to obtain principal column spaces, and optimizes the local scatter 230 via a principal column space and a local Laplacian scatter matrix 232 to produce the maximized local scatter 216.

The local scatter alignment engine 204 includes a selection matrix 234 derived from the local Laplacian scatter matrix 232, and an optimizer 236 that includes an Eigen analyzer 238 and a global Laplacian scatter matrix 240.

The global scatter formulator 206 may further include a global scatter maximizer 242, including an Eigen-decomposition engine 244 that operates on global scatter 246 to obtain a global projection matrix 248.

Example Operation of the Exemplary Engine

The exemplary LPCA engine 106 is only one example configuration and will be described in greater detail in the sections that follow.

Laplacian PCA (LPCA)

The exemplary LPCA engine 106 aims to initially maximize the local scatter 230 of data instead of the global scatter pursued by conventional PCA. The local scatter 230 is the summation of weighted distance between low-dimensional representations of original samples and their means. Like conventional PCA, the exemplary LPCA engine 106 aims to eventually find a global projection matrix U 248 such that Equation (1) holds:

$$y = U^T(x - \bar{x}), \quad (1)$$

where global projection matrix U 248 is of size D by d. In the matrix form, this can be written as $Y = U^T(XH)$. The following description presents operation of components such as the local scatter formulator 202 or "local LPCA engine," the local scatter alignment engine 204, the global scatter formulator 206 ("global LPCA engine"), and the efficient LPCA features engine 208.

Local LPCA/Local Scatter Formulator

For non-Gaussian or manifold-valued data, local data patches 224 are used because non-Gaussian data can be viewed from a locally Gaussian standpoint and a curved manifold can be viewed from a locally Euclidean standpoint. In addition, Gaussian distribution is a theoretical base of many statistical operations, while tangent spaces and tangent coordinates are fundamental descriptors of a manifold. Local LPCA is described first.

Specifically, let a, denote the local scatter 230 on the i-th neighborhood $S_i^y$. The local scatter 230 can be defined in Equation (2) as:

$$\alpha_i = \sum_{k=0}^{K} w_{i_k} \|y_{i_k} - \bar{y}_i\|_{R^d}^2, \quad (2)$$

where $w_{i_k}$ is the related weight and $\bar{y}_i$ is the geometric centroid of $S_i^y$, i.e., $$\bar{y}_i = \frac{Y_i W_i e}{e^T W_i e}.$$

A definition of $w_{i_k}$ is presented further below. The distances between $y_{i_k}$ and $\bar{y}_i$ are measured by the $l_2$ normal $\|\bullet\|_{R^d}$. Rewriting Equation (2) yields Equation (3):

$$\alpha_i = \sum_{k=0}^{K} w_{i_k} tr\{(y_{i_k} - \bar{y}^i)(y_{i_k} - \bar{y}^i)^T\} \quad (3)$$
$$= tr(Y_i W_i Y_i^T) - \frac{tr(Y_i W_i e e^T W_i Y_i^T)}{e W_i e^T}.$$

In turn, Equation (4) is obtained:

$$\alpha_i = tr(Y_i L_i Y_i^T) \quad (4)$$

where, in Equation (5), $$L_i = W_i - \frac{W_i e e^T W_i}{e W_i e^T} \quad (5)$$

is referred to as the local Laplacian scatter matrix 232. For $Y_i$, Equation (6) gives:

$$Y_i = U_i^T(X_i - \bar{x}_i e^T) = U_i^T(X_i H_w), \quad (6)$$

where $\bar{x}_i$ is the geometric centroid of $S_i^x$. Plugging $Y_i = U_i^T(X_i H_w)$ into Equation (4) gives Equation (7):

$$\alpha_i = tr(U_i^T X_i H_w L_i H_w^T X_i^T U_i). \quad (7)$$

It is not difficult to determine that $H_w L_i H_w^T = L_i$. So, the final expression of the local scatter 230 is given in Equation (8):

$$\alpha_i = tr(U_i^T S_i^i U_i), \quad (8)$$

where $S_i^i = X_i L_i X_i^T$ is the local scatter matrix 228 of $S_i^x$. Imposing the orthogonality constraint on $U_i$, the scatter maximizer 214 performs the maximization problem shown in Equation (9):

$$\begin{cases} \arg\min tr(U_i^T X_i L_i X_i^T U_i) \\ U_i^T U_i = I \end{cases} \quad (9)$$

where $U_i$ is essentially the principal column space of local scatter matrix $S_i^i$ 228, i.e., the space spanned by the Eigenvectors associated with the d largest Eigenvalues of local scatter matrix $S_i^i$ 228.

Local Scatter Alignment

The local scatter alignment engine 204 enables global analysis of aligned localities. This enables derivation of the global Y, or the global projection matrix U 248. Traditionally, a Gaussian Mixing Model (GMM) along with an Explicit Monodomain (EM) schema is applied to fulfill the task of creating a conventional global projection matrix. But an approach that is hopefully straightforward is also needed to accommodate spectral methods. The exemplary LPCA engine 106 provides a unified framework for alignment in spectral methods, in which optimal solutions in closed form can be obtained by the Eigen analyzer 238.

In one implementation, the following form of optimization shown in Equation (10), similar to Equation (4), is applied with respect to the local patches 224:

$$\arg\max_{Y} tr(Y_i L_i Y_i^T) \quad (10)$$

where $L_i$ is the local Laplacian scatter matrix 232. In fact, alternatively, $L_i$ can be an arbitrary matrix that embodies the geometry of data of the local patch 224. For each $S_i^y$, there is $S_i^y \subset S^y$, meaning that $\{y_{i_0}, y_{i_1}, \ldots, y_{i_K}\}$ are always selected from $\{Y_1, \ldots, Y_n\}$. Furthermore, selection labels are known from a process of nearest neighbors searching. Thus, $Y_i = YS_i$, where $S_i$ is the n by (K+1) binary selection matrix 234 associated with $S_i^y$. Letting $I = \{i_0, i_1, \ldots, i_K\}$ denote the label set, it is not difficult to determine that the structure of $S_i$ can be expressed by Equation (11):

$$(S_i)_{pq} = \begin{cases} 1 & \text{if } p = i_{i-1} \\ 0 & \text{otherwise} \end{cases}, \quad i_{q-1} \in I_i, q = 1, \ldots, K+1, \quad (11)$$

which means that $(S_i)_{pq} = 1$ if the q-th vector in $Y_i$ is the p-th vector in Y. Then, rewriting Equation (10) gives Equation (12):

$$\arg\max_{Y} tr(YS_i L_i S_i^T Y^T). \quad (12)$$

For each $S_i^y$, the optimizer 236 performs such maximization. This gives the following problem in Equation (13):

$$\arg\max_{Y} \sum_{i=1}^{n} tr(YS_i L_i S_i^T Y^T) = \arg\max_{Y} tr(YLY^T), \quad (13)$$

where $$L = \sum_{i=1}^{n} S_i L_i S_i^T$$

is called the global Laplacian scatter matrix 248. The expression of L implies that, initialized by a zero matrix of the same size, L can be obtained by the update $L(I_i, I_i) \leftarrow L(I_i, I_i) + L_i$. This exemplary alignment technique is capable of aligning general local geometry matrices in manifold learning as well.

Laplacian PCA (LPCA)

For exemplary LPCA, the global scatter formulator 206 aims to derive a global projection matrix 248. To this end, the global scatter maximizer 242 plugs $Y=U^T(XH)$ into Equation (13) to derive an expression of the global scatter 246 when the global Laplacian scatter matrix 240 is ready. This obtains the following maximization problem in Equation (14):

$$\begin{cases} \arg\min_{U} tr(U^T XHLHX^T U) \\ U^T U = I \end{cases} \quad (14)$$

Similar to the optimization in Equation (9), the Eigen decomposition engine 244 can obtain U in Equation (14) by the Eigen-decomposition of $XHLHX^T$.

Efficient Computation

For real data the dimensionality of $x_i$ may be large. So it is computationally expensive to compute $U_i$ in Equation (10) by the Eigen-decomposition of $S_j^i$. However, the computation of local $Y_i$ in Equation (9) can be significantly simplified via Singular Value Decomposition (SVD) when K<<D.

For the local Laplacian scatter matrix $L_i$ 232 and the global Laplacian scatter matrix L 240, it is easy to verify that $L_i e=0$ and $Le=0$, implying that they have zero Eigenvalues and the corresponding Eigenvectors are the all-one vectors. Thus, $Y_i$ in Equation (10) and Y in Equation (14) are all centered at the origin. For $L_i$, it is not difficult to check that $L_i=\tilde{L}_i\tilde{L}_i^T$, where in Equation (15):

$$\tilde{L}_i = H_w W_i^{1/2} \quad (15)$$

Then the local scatter matrix $S_j^i$ 228 can be rewritten as $S_j^i = X_i \tilde{L}_i (X_i \tilde{L}_i)^T$. This gives rise to the following theorem:

Theorem 1: Let the d-truncated SVD of the tall-skinny matrix $X_i \tilde{L}_i$ be $X_i \tilde{L}_i = P_i D_i Q_i^T$. Then the left singular matrix $P_i$ is the local projection matrix $U_i$, and the local coordinate $Y_i$ is $$Y_i = (Q_i D_i)^T W_i^{-\frac{1}{2}}.$$

By Theorem 1, the computational complexity of $U_i$ and $Y_i$ is reduced from $O(D^3)$ to $O(DK^2)$. Such acceleration is highly advantageous for computing tangent coordinates in manifold learning.

Exemplary Manifold Learning Applications

In many cases, the data set $S^x$ is manifold-valued. The low-dimensional representations can be obtained by non-linear embeddings of original points. In one implementation, the exemplary LPCA system 100 formulates tangential maps between manifolds to fulfill such tasks. The tangent spaces and the tangent coordinates of a manifold are approximated by local LPCA.

Tangential Maps

The tangential map engine 207 provides tangential maps which are essentially linear transformations of tangent coordinates approximated by the local LPCA engine—i.e., the local scatter formulator 202. For a d-dimensional Riemannian manifold $M^d$, its tangent space at each point is isomorphic to the Euclidean space $R^d$. Thus, linear transformations are allowable between tangent spaces of $M^d$ and $R^d$. Given a set of points $S^x$ sampled from $M^d$, the parameterization of $M^d$ can be performed by tangential maps, where $x_i$ is viewed as the natural coordinate representation in the ambient space $R^D$ in which $M^d$ is embedded.

With a little abuse of notation, $\tilde{S}_i^y = \{\tilde{y}_{i_0}, \tilde{y}_{i_1}, \ldots, \tilde{y}_{i_K}\}$ can be used to denote the low-dimensional representation yielded by the local LPCA of $S_i^x$, where an extra constraint d<K should be imposed. The global representation $\tilde{S}_i^y$ is obtained via the following linear transformation of $\tilde{S}_i^y$ in Equation (16):

$$Y_i H_w = A_i \tilde{Y}_i + E_i, \quad (16)$$

where $E_i$ is the error matrix and $A_i$ is the Jacobian matrix of size K+1 by K+1 to be determined. Here, $Y_i$ is centerized by $H_w$ because the center of $\tilde{S}_i^y$ lies at the origin. To derive the optimal $Y_i$, $E_i$ is minimized, thus giving in Equation (17):

$$\arg\min_{Y_i} \|E_i\|^2 = \arg\min_{Y_i} \|Y_i H_w - A_i \tilde{Y}_i\|^2 \quad (17)$$

For the Jacobin matrix, there is $A_i = Y_i H_w \tilde{Y}_i^+$, where "+" denotes the Moore-Penrose inverse of a matrix. Plugging this into Equation (17) and expanding the norm yields, in Equation (18):

$$\arg\min_{Y_i} tr(Y_i Z_i Y_i^T), \quad (18)$$

where, in Equation (19):

$$Z_i = H_w (I - \tilde{Y}_i^+ \tilde{Y}_i)(I - \tilde{Y}_i^+ \tilde{Y}_i)^T H_w^T. \quad (19)$$

What is desired is the global representation Y instead of local $Y_i$. So, the local scatter alignment engine 204 aligns local representations to a global representation.

To make the optimization well-posed, constraint is applied on Y. For example, $YY^T=I$. Putting these representations together, a well-posed and easily solvable minimization problem is obtained, in Equation (20):

$$\begin{cases} \arg\min_{Y} tr(Y^T L Y^T) \\ Y^T Y = I \end{cases}, \quad (20)$$

where $L = \sum_{i=1}^{n} S_i Z_i S_i^T$.

Again, the optimization can be solved by the spectral decomposition of L: the d-column matrix $Y^T$ corresponds to the d Eigenvectors associated with the d smallest nonzero Eigenvalues of L. This finally provides a general framework for tangential maps.

Exemplary LPCA Based on Tangential Maps

In general, in one implementation, the principal subspace of data set $S_i^x$ is employed as the approximation of the tangent space tangent to the point $x_i$. Thus, more robust approximation of the tangent space can provide even better results of manifold unfolding. For exemplary LPCA however, $Z_i$ can be obtained, without the explicit computation of $\tilde{Y}_i^+$, by the following theorem:

Theorem 2: $Z_i = H_w (I - \tilde{Q}_i (\tilde{Q}_i^T \tilde{Q}_i)^{-1} \tilde{Q}_i^T) H_w^T$, where $\tilde{Q}_i = W_i^{1/2} Q_i$.

The inverse of $\tilde{Q}_i^T \tilde{Q}_i$ can be efficiently handled because $\tilde{Q}_i^T \tilde{Q}_i$ is of size $d$ by $d$. The computation of $Z_i$ is efficient by noting that $H_w$ is a rank-one modification of I, and $W_i$ is diagonal. For exemplary Labeled Transition System Analysis (LTSA), there is the following observation:

Proposition 1. LPCA-based tangential maps coincide with the LTSA algorithm if $W_i = I$.

Therefore, in one implementation, the framework formulated herein is the generalization of Zhang and Zha's LTSA.

Exemplary LPCA-Based Face Recognition

In face recognition, exemplary LPCA can be performed to map samples into a low-dimensional feature space where the new representations are viewed as expressive features. In a feature space, each sample is typically represented as a point in n-dimensional space that has a dimensionality determined by the number of features used to describe the sample. Discriminators such as Linear Discriminant Analysis (LDA), Locality Preserving Projection (LPP), and Marginal Fisher Analysis (MFA) can then be performed in the LPCA-transformed spaces. The LPCA-based expressive features provided by the LPCA features engine 208 significantly improve the discriminative performance of three representative discriminators, LDA, LPP, and MFA. Further, dimensionality reduction on the Local Binary Pattern (LBP) non-Euclidean features also indicates superiority of exemplary LPCA to PCA and kernel PCA.

Figure 3:
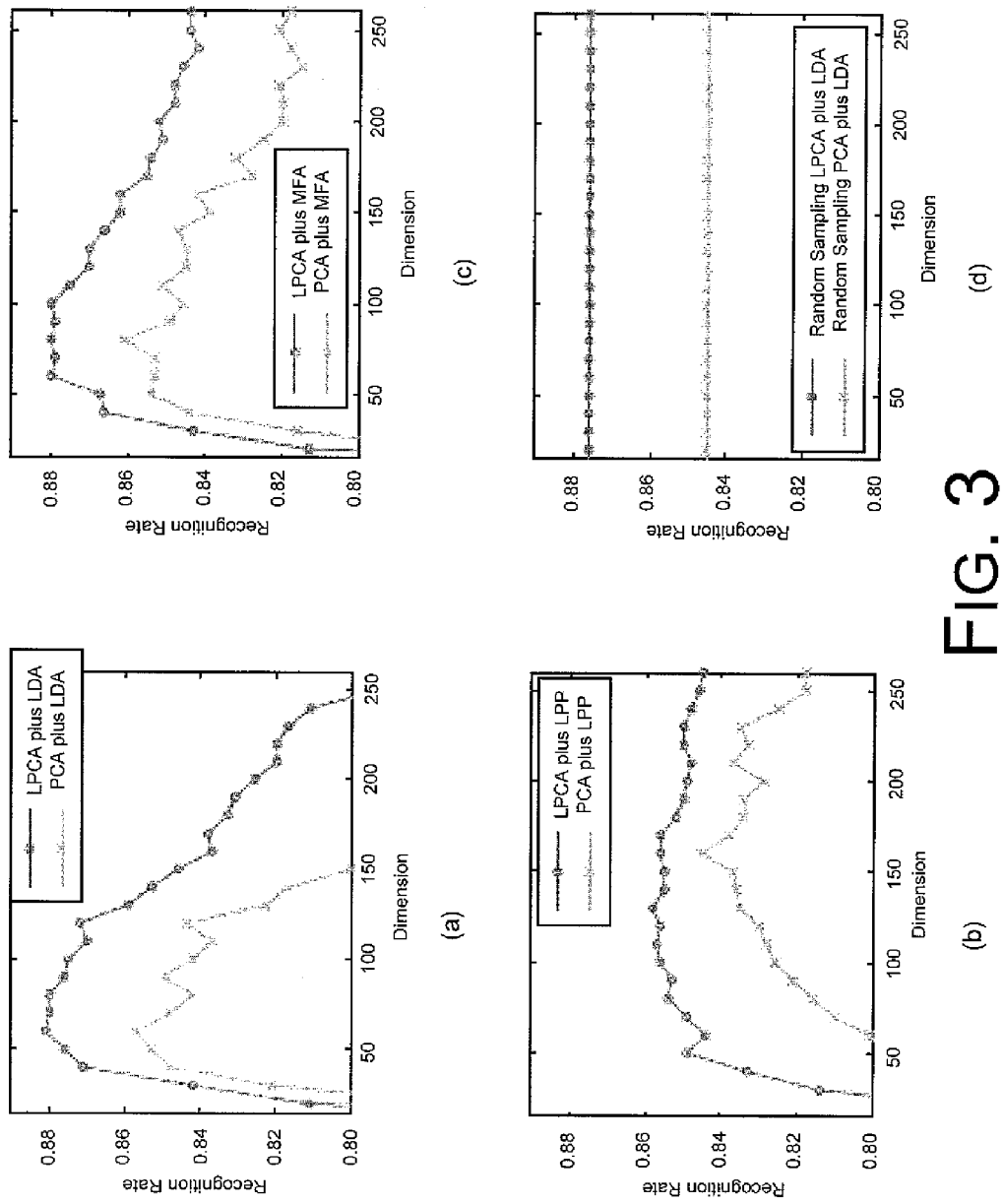
FIG. 3 is diagram showing performance of the exemplary LPCA versus conventional PCA in extracting expressive features.

FIG. 3 shows performance of the exemplary LPCA features engine 208 versus conventional PCA as expressive feature extractors for face recognition. In one example test, the dimensions of original facial images are reduced to be 290. Thus, LPCA and PCA preserve 95% power and 98.8% power, respectively. The power is defined as the ratio of the summation of Eigenvalues corresponding to applied Eigenvectors to the trace of scatter matrix. FIG. 3(a) shows LDA. FIG. 3(b) shows LPP (K=2). FIG. 3(c) shows MFA (k1=2; k2=20). FIG. 3(d) shows random sampling subspace LDA, with 400 Eigenvectors computed. The first 50 Eigenvectors are taken as the base, and another 100 Eigenvectors are randomly sampled. Twenty LDA classifiers are designed. FIG. 3 shows the superiority of exemplary LPCA to conventional PCA for expressive feature extraction in facial recognition.

Definition of Weights

In conventional techniques, weights are determined by exponentials of Euclidean distances or its analogues. Such pair-wise distance-based dissimilarities cannot capture the principal structure of data robustly. So, in one implementation, the exemplary LPCA system 100 uses reductive coding length as a new dissimilarity that is compatible with the intrinsic structure of data.

The coding length $L(S_i^x)$ of a vector-valued set $S_i^x$ is the intrinsic structural characterization of the set. If a point $x_{i_k}$ complies with the structure of $S_i^x$, then removing $x_{i_k}$ from $S_i^x$ does not affect the structure very much. In contrast, if the point $x_{i_k}$ is an outlier or a noise point, then removing $x_{i_k}$ from $S_i^x$ changes the structure significantly. Thus, the exemplary LPCA system 100 defines the variation of coding length as the structural descriptor between $x_{i_k}$ and $S_i^x$. The reductive variation of $L(S_i^x)$ with and without $x_{i_k}$ is defined as in Equation (21):

$$\delta L_{i_k} = |L(S_i^x) - L(S_i^x \setminus \{x_{i_k}\})|, k=0,1,\ldots,K, \quad (21)$$

where $|\bullet|$ denotes the absolute value of a scalar. Thus, the weight $w_{i_k}$ in Equation (2) can be defined as in Equation (22):

$$w_{i_k} = \exp\left(-\frac{(\delta L_{i_k} - \overline{\delta L_i})^2}{2\sigma_i^2}\right) \quad (22)$$

where $\overline{\delta L_i}$ and $\sigma_i$ are the mean and the standard deviation of $\{\delta L_{i_0}, \delta L_{i_1}, \ldots \delta L_{i_K}\}$, respectively.

Exemplary Coding Length Versus Conventional Distance

Figure 4:
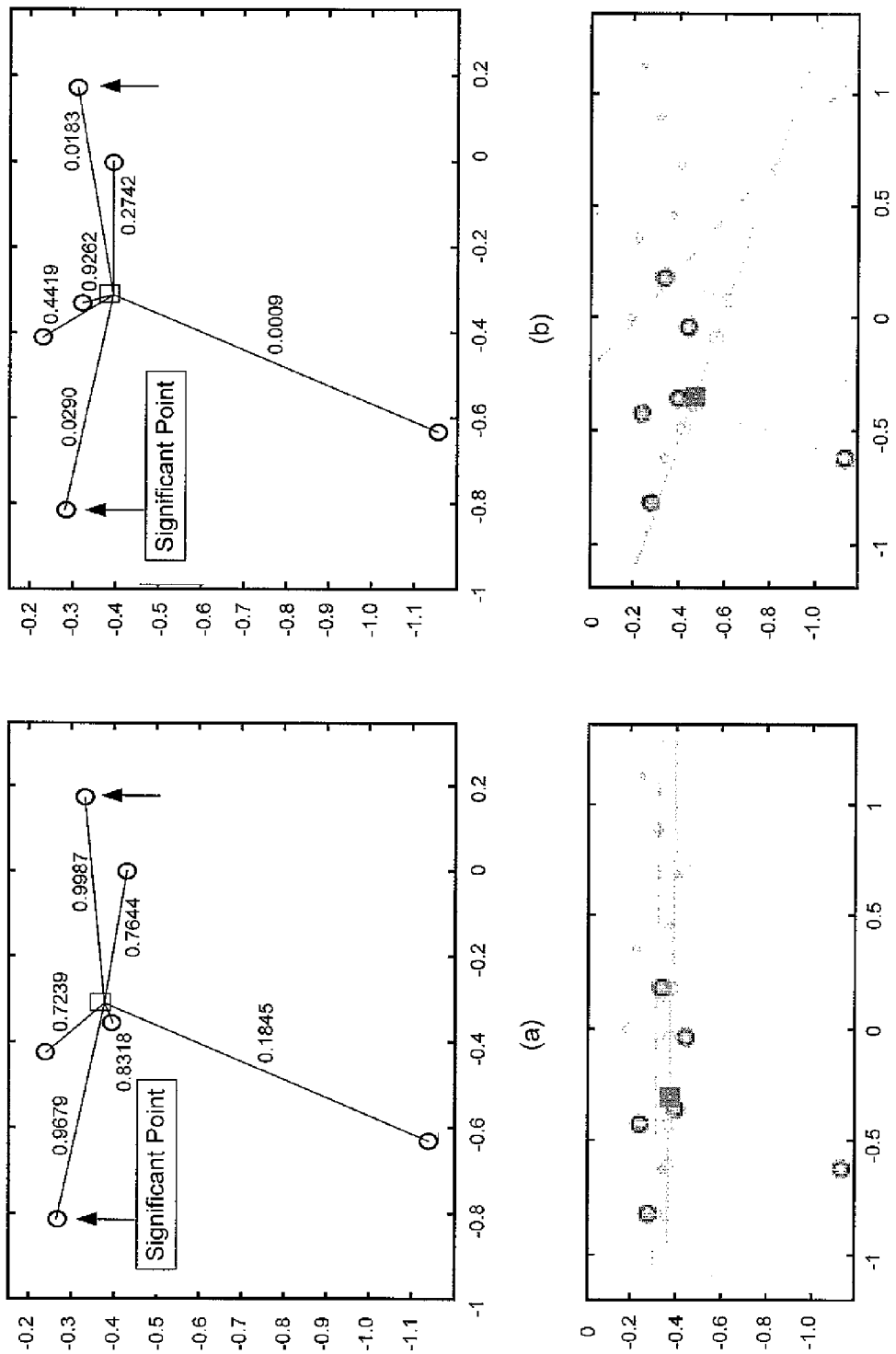
FIG. 4 is a diagram showing exemplary use of reductive coding length versus conventional pair-wise Euclidean distance on data patches.

An example compares the difference between reductive coding length and conventional pair-wise distance. FIG. 4 shows reductive coding length vs. pair-wise Euclidean distance on one of the local patches 224 (circle markers) of the example data. FIG. 4(a) and FIG. 4(b) illustrate the weights computed by reductive coding length and pair-wise Euclidean distance, respectively. In FIG. 4(b), the square marker denotes the geometric center instead of physical centroid. FIG. 4(c) and FIG. 4(d) illustrate the local principal directions (solid lines) learned by exemplary LPCA based on reductive coding length and pair-wise Euclidean distance, respectively.

From FIG. 4(a), it is observed that, using reductive coding length, the perturbed point (bottom) is slightly weighted whereas the five points that are consistent to the principal structure are heavily weighted. As shown in FIG. 4(c), the local principal direction (solid line) learned by exemplary LPCA based on reductive coding length is highly consistent with the global principal structure (dotted line).

In contrast, as shown in FIG. 4(b), at first it seems promising that the perturbed point is very lightly weighted. However, the two significant points (pointed by two arrows) that are important to the principal structure are also lightly weighted. Thus, the local principal direction is mainly governed by the three central points. As a result, the principal direction (dotted line in FIG. 4(d)) learned by LPCA based on pair-wise Euclidean distance cannot capture the principal structure of the data. But on the other hand, utilizing reductive coding length, the two significant points are most heavily weighted (FIG. 4(a)).

Exemplary Methods

Figure 5:
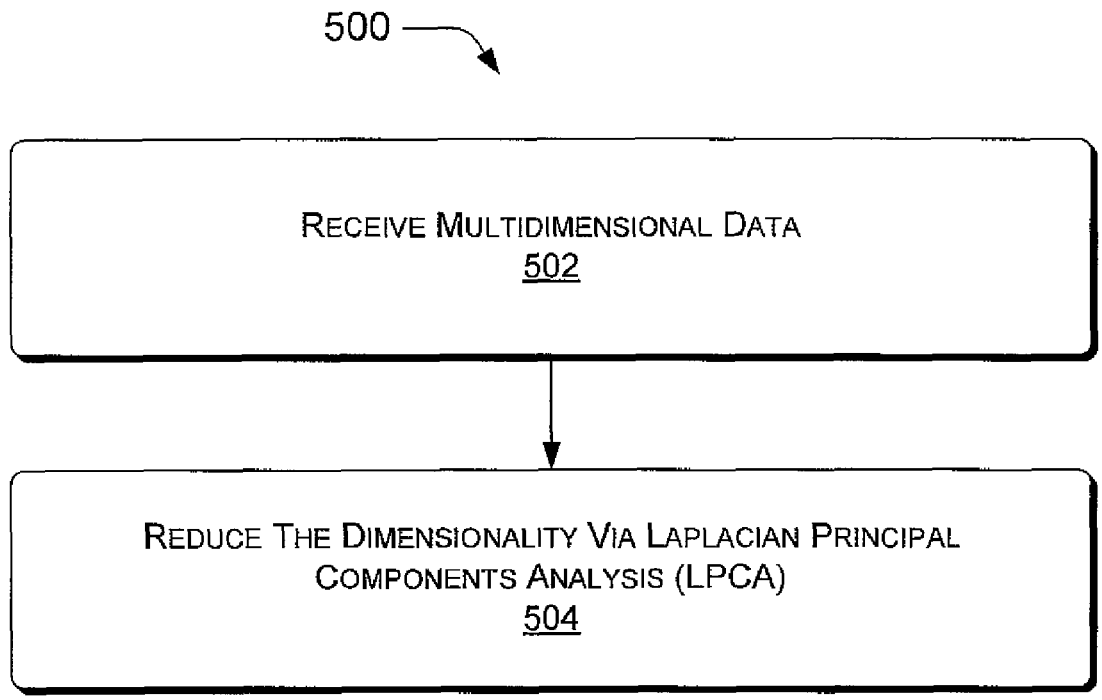
FIG. 5 is a flow diagram of an exemplary method of reducing the dimensionality of data.

FIG. 5 shows an exemplary method 500 of reducing the dimensionality of data. In the flow diagram, the operations are summarized in individual blocks. The exemplary method 500 may be performed by hardware, software, or combinations of hardware, software, firmware, etc., for example, by components of the exemplary LPCA engine 106.

At block 502, multidimensional data is received. The data can be high-dimensionality information from one of various applications, such as computer vision, pattern recognition, manifold learning, signal processing, etc.

At block 504, the dimensionality of the data is reduced via Laplacian Principal Components Analysis (LPCA). The LPCA optimizes locally weighted scatters instead of the single global non-weighted scatter of conventional PCA.

Figure 6:
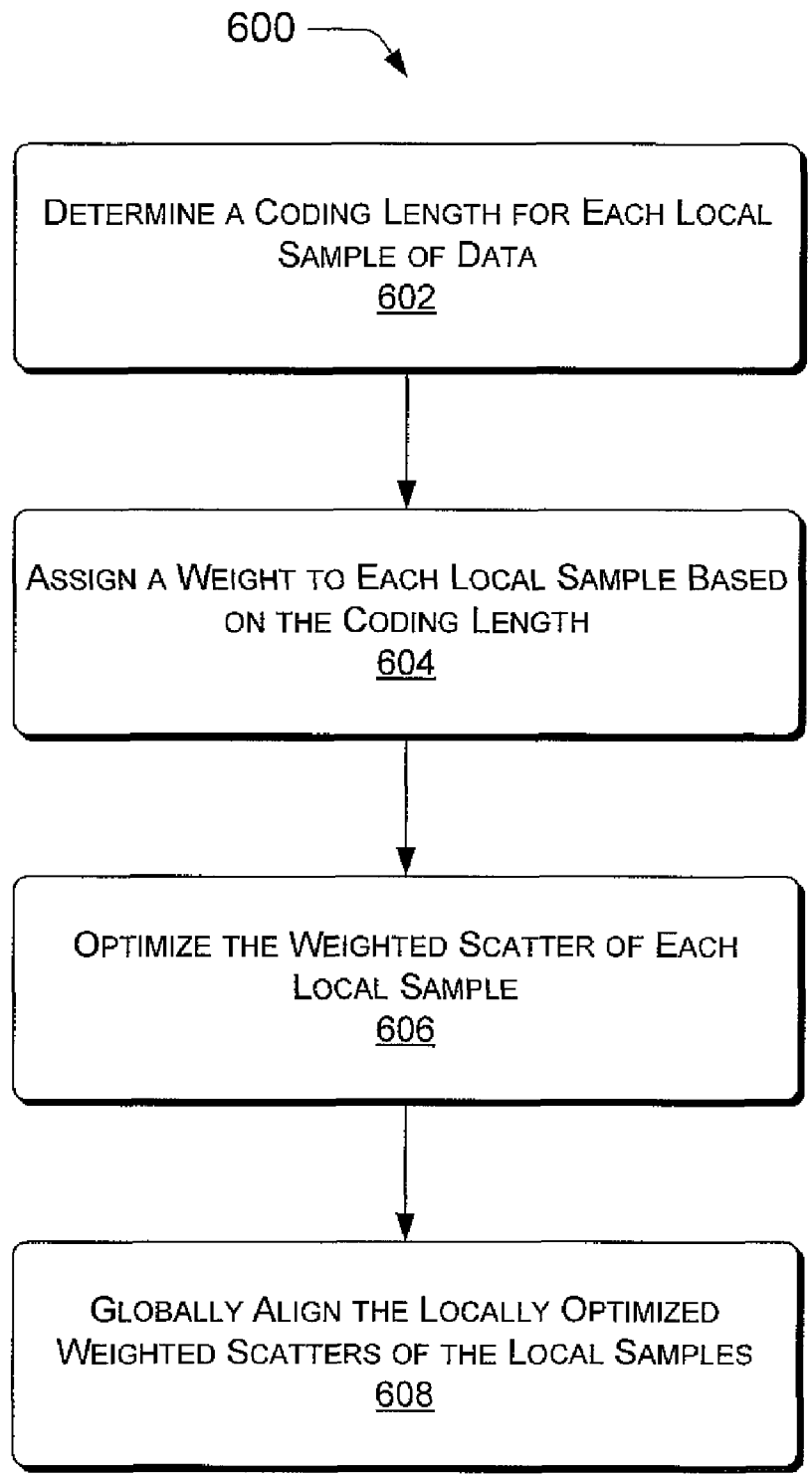
FIG. 6 is a flow diagram of an exemplary method of performing Laplacian Principal Components Analysis (LPCA).

FIG. 6 shows an exemplary method 600 of performing LPCA. In the flow diagram, the operations are summarized in individual blocks. The exemplary method 600 may be performed by hardware, software, or combinations of hardware, software, firmware, etc., for example, by components of the exemplary LPCA engine 106.

At block 602, a coding length for each local sample of received data is determined. In one implementation, coding length captures the principal structure of data better than conventional exponentials of Euclidean distances or pair-wise distance based on dissimilarities.

At block 604, a weight for each of the local samples is assigned based on the coding length.

At block 606, the weighted scatter of each local sample is locally optimized. An expression for local scatter is derived via a local Laplacian scatter matrix. In one implementation, a maximization of the local scatter expression is performed by applying Eigen-decomposition.

At block 608, the locally optimized weighted scatters of the local samples are globally aligned. An expression for global scatter can be obtained via a global Laplacian scatter matrix. Eigen-decomposition can be applied to maximize the global scatter and achieve an improved global projection matrix over conventional global projection matrices.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented at least in part by a computer, the method comprising:
    receiving multidimensional data by the computer;
    reducing, by the computer, dimensionality of the multidimensional data via Laplacian Principal Components Analysis (LPCA);
    producing a projection matrix based on the LPCA; and
    providing the projection matrix.

2. The method as recited in claim 1, wherein reducing dimensionality includes locally optimizing a scatter on a local sample of the multidimensional data.

3. The method as recited in claim 2, wherein locally optimizing the scatter on the local sample includes summing weighted distances between low dimensional representations of the multidimensional data and a mean of the low dimensional representations.

4. The method as recited in claim 3, wherein summing the weighted distances includes determining weights of the distances based on the coding length of each local sample in order to capture a local principal structure of the multidimensional data.

5. The method as recited in claim 4, wherein determining the weight of a distance includes determining a reductive coding length associated with the distance, comprising varying the coding length of the local sample by leaving one point out.

6. The method as recited in claim 2, wherein reducing dimensionality includes globally aligning local optimizations, including globally aligning locally Gaussian subspaces or linear subspaces.

7. The method as recited in claim 6, wherein globally aligning uses a manifold learning technique.

8. The method as recited in claim 6, wherein reducing dimensionality includes learning a principal subspace via the global aligning of the local optimizations.

9. The method as recited in claim 8, wherein learning an optimal principal subspace includes an Eigen-decomposition process.

10. The method as recited in claim 6, wherein the projection matrix comprises a global projection matrix.

11. The method as recited in claim 1, further comprising deriving expressive features based on the LPCA to improve performance of discriminators in a face recognition application.

12. The method as recited in claim 11, further comprising reducing dimensionality of non-Euclidean features.

13. The method as recited in claim 1, further comprising deriving tangential maps based on the LPCA for non-linear dimensionality reduction in a manifold unfolding application.

14. The method as recited in claim 13, wherein deriving the tangential maps includes deriving linear transformations of tangent coordinates approximated by the local LPCA.

15. A method implemented at least in part by a computer, the method comprising:
    receiving multidimensional data by the computer;
    determining, by the computer, a local principal structure and a scatter for each of multiple local samples of the multidimensional data, including:
        determining a coding length for each local sample; and
        determining a weight for each of the local samples based on the coding length; and
    locally optimizing a weighted scatter of each local sample to provide Laplacian Principal Components Analysis (LPCA).

16. The method as recited in claim 15, further comprising globally aligning the locally optimized weighted scatters of the local samples.

17. The method as recited in claim 15, further comprising aligning tangential maps to perform manifold unfolding, wherein the tangential maps comprise linear transformations of tangential coordinates approximated by the LPCA.

18. The method as recited in claim 15, further comprising deriving LPCA-based expressive features to perform face recognition.

19. A system, comprising:
    memory;
    at least one processor communicatively coupled to the memory for executing components including:
        a local scatter formulator to perform local Laplacian Principal Components Analysis (LPCA) on local samples of data;
        a local scatter alignment engine to globally align locally optimized weighted scatters of the local samples; and
        a global scatter formulator to perform global LPCA using the optimized local scatters to provide a global projection matrix.

20. The system as recited in claim 19, further comprising a coding length engine associated with the local scatter formulator to determine a reductive coding length of each local sample for determining a weight for each of the local samples.

* * * * *